United States Patent [19]

Scharwächter et al.

[11] Patent Number: 5,171,500
[45] Date of Patent: Dec. 15, 1992

[54] PIPE MANUFACTURING LINE

[75] Inventors: Dieter Scharwächter, Espoo; Jyri Järvenkylä, Salpakangas, both of Finland

[73] Assignee: Uponor N.V., Sint Maarten, Netherlands Antilles

[21] Appl. No.: 810,555

[22] Filed: Dec. 20, 1991

Related U.S. Application Data

[62] Division of Ser. No. 594,840, Oct. 9, 1990, abandoned.

[30] Foreign Application Priority Data

Oct. 27, 1989 [FI] Finland .................. 895105

[51] Int. Cl.⁵ ........................................... B29C 59/00
[52] U.S. Cl. ....................................... 264/167; 264/508; 425/185; 425/396
[58] Field of Search ............... 425/185, 186, 369, 396; 264/286, 287, 167, 508

[56] References Cited

U.S. PATENT DOCUMENTS

| | | | |
|---|---|---|---|
| 3,286,305 | 11/1966 | Seckel | 425/396 |
| 3,430,292 | 3/1969 | Bauman et al. | 425/396 |
| 3,751,541 | 8/1973 | Hegler | 364/508 |
| 3,844,700 | 10/1974 | Sokolow | 425/396 |
| 3,881,851 | 5/1975 | Allanic et al. | 425/396 |
| 3,919,367 | 11/1975 | Maroschak | 264/167 |
| 3,981,663 | 9/1976 | Lupke | 425/396 |
| 3,994,646 | 11/1976 | Hauck | 425/369 |
| 4,038,011 | 7/1977 | Lemelson | 425/396 |
| 4,136,143 | 1/1979 | Lupke et al. | 425/396 |
| 4,199,314 | 4/1980 | Lupke et al. | 425/396 |
| 4,226,580 | 10/1980 | Lupke et al. | 425/369 |
| 4,325,685 | 4/1982 | Lupke et al. | 425/185 |
| 4,374,079 | 2/1983 | Fouss et al. | 264/508 |
| 4,382,056 | 5/1983 | Coonrod | 264/167 |
| 4,449,910 | 5/1984 | Leloux | 264/508 |
| 4,473,525 | 9/1984 | Drori | 264/508 |
| 4,504,206 | 3/1985 | Lupke et al. | 425/185 |
| 5,017,321 | 5/1991 | Comfort | 264/167 |

Primary Examiner—David A. Simmons
Assistant Examiner—William J. Matney, Jr.
Attorney, Agent, or Firm—Ladas & Parry

[57] ABSTRACT

A production line for manufacturing corrugated pipe also has a calibrating basin for manufacturing smooth-walled pipe arranged between form paths of the corrugator when the paths have been separated. An extruder that normally feeds a molten plastic pipe blank to the corrugator for making corrugated pipe then feeds the pipe blank to the calibrating basin for making smooth-walled pipe, and other down-the-production-line equipment can be the same, too.

14 Claims, 1 Drawing Sheet

PIPE MANUFACTURING LINE

This is a divisional of copending application Ser. No. 07/594,840 filed on Oct. 9, 1990 now abandoned.

BACKGROUND OF THE INVENTION

This invention relates to a production line for manufacturing either corrugated or ribbed pipe (hereinafter called corrugated pipe) or smooth-walled pipe.

Finnish Pat. No. 60 825, European patent application No. 208 055 and German patent publication Nos. 36 22 775 and 36 22 225, for example, each disclose a production line for manufacturing corrugated pipes wherein plastic is extruded from a die between movable form, i.e. mould, halves that are pressed against one another to provide circumferentially continuous flangelike ribs to the exteriors of the pipes. (The movable form halves and their control unit are hereinafter called a corrugator.) Such a production line is very weighty, requires exact installation, and is in most cases too efficient in relation to the demand for corrugated pipes, wherefore the production line stands idle most of the time.

SUMMARY OF THE INVENTION

The invention now disclosed is based on the recognition of the above problems, on the recognition that a production line for corrugated pipes has, except for the corrugator, the same components (manufacturing machinery) as a production line for smooth-walled pipes, and on the recognition that some corrugator designs permit upper and lower paths along which the form halves are movable to be separated (e.g. for changing the form halves (i.e. moulds or their maintenance). Thus, the improved production line for plastic pipe according to the invention is characterized in that the forming means for the pipes to be produced, i.e. the corrugator, also has forming means for making smooth-walled pipes, i.e. a known calibrating basin, for arrangement between the paths of the form halves of the corrugator. An extruder that otherwise supplies the corrugator then feeds a molten plastic pipe blank instead into the calibrating basin. The smooth-walled plastic pipe that then issues from the other end of the calibrating basin is treated with the same further components (manufacturing machinery) as the corrugated pipe that otherwise would have been produced.

The most significant advantage of the invention is that the expensive corrugated-pipe production line need not stand idle when the demand for corrugated pipe is satisfied, but rather, without replacing the corrugator or otherwise dismantling its production line, smooth-walled plastic pipe may be produced instead until there is renewed demand for corrugated pipe. Then, the calibrating basin is simply removed, possibly the moulds for the then-desired corrugated pipe are installed, the moulds are driven together, and normal production of corrugated pipe is re-started.

BRIEF DESCRIPTION OF THE DRAWING

The invention will now be explained by way of an example with reference to the accompanying drawing wherein.

DESCRIPTION OF EXEMPLARY EMBODIMENTS

Figure 1:
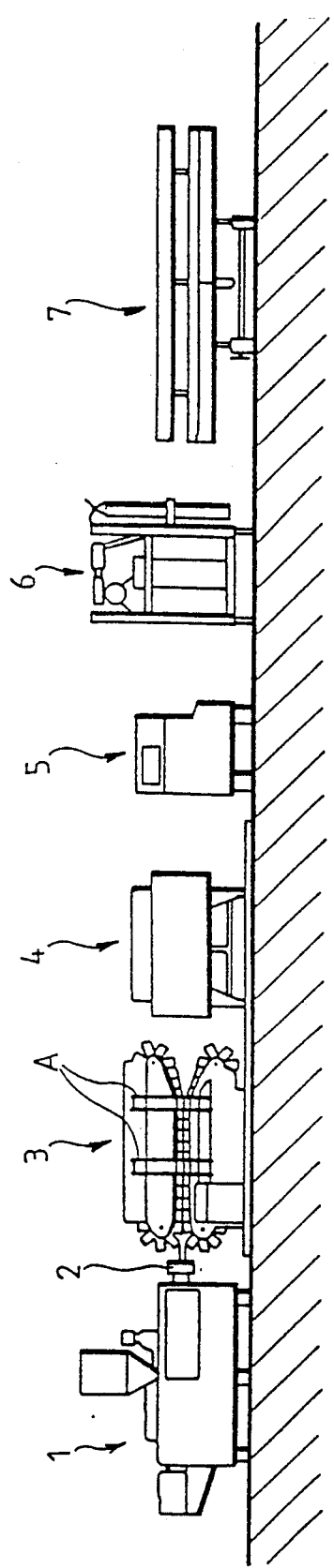
FIG. 1 schematically shows a conventional production line for corrugated pipe.

In the production line for ribbed pipe according to FIG. 1, an extruder is denoted with reference numeral 1, a die of the extruder with reference numeral 2, a corrugator with reference numeral 3, a pipe cooling basin with reference numeral 4, pipe drawing apparatus with reference numeral 5, cutting apparatus with reference numeral 6 and finishing and treating apparatus for a pipe product cut to a predetermined length with reference numeral 7. This production line differs from a production line for smooth pipe essentially in respect of the corrugator 3. The corrugator is of the type having two circulation paths for form, i.e. mould, halves. The circulation paths may be separated by means of vertical displacing means A. The latter is shown in the Figure schematically, but it may be, for example, rotatable screws. Corrugators having other mould paths can also be used. The full purpose and function of the other components (manufacturing machinery) in the production line are obvious to a person skilled in the art and, thus, are not more precisely explained herein.

Figure 2:
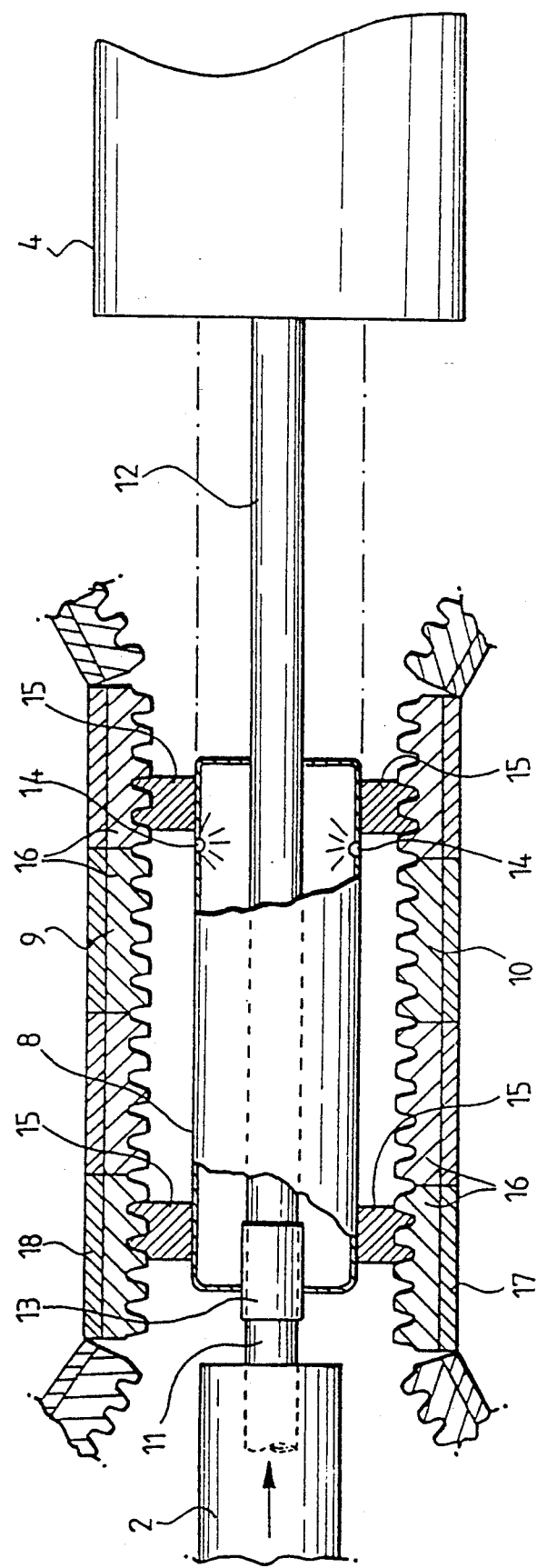
FIG. 2 shows a calibrating basin for manufacturing smooth pipe within a corrugator and portions of other components, partly in section, similar to those of FIG. 1 and in accordance with the invention.

FIG. 2 shows, in accordance with the invention, a calibrating basin 8 disposed between separated paths of mould or form halves 9, 10 of the corrugator (3 in FIG. 1). A molten plastic pipe blank 11 is fed from the die 2 of the extruder (1 in FIG. 1), as indicated by the arrow, through a brass calibrating barrel 13 at one end of the calibrating basin and into the calibrating basin. The inside of the calibrating basin is a cooling space having a subatmospheric pressure that draws the pipe blank 11 tightly against the inner wall of the calibrating barrel, thereby forming the pipe blank 11 into a pipe 12 having a glassy, smooth surface. The pipe is also cooled as it traverses the length of the calibrating basin by water jets 14 in accordance with the prior art, whereafter it leaves the calibrating basin drawn by the drawing means (5 in FIG. 1), as the pipe 12 is adjusted to predetermined dimensions and cooled. The cooling and the production rate may be improved by using several cooling basins (4 in FIG. 1, where only one is shown).

The calibrating basin 8 may be supported between the mould or form halves 9, 10, which is constituted by series-connected moulds 16, by fixing it to the mould screws (A in FIG. 1) or by distance pieces 15 resting on the moulds 16 as has been shown in FIG. 2. The calibrating basin could also be a part of the cooling basin 4 that is telescopically pushed between the open moulds of the corrugator, as shown in dotted line in FIG. 2.

Depending on the structure of the corrugator and the size range of the pipes to be produced, one may also proceed in such a manner that the moulds are removed and the cooling basin 8 is placed between transport elements 17, 18 for holding the mould forms.

It is obvious to the person skilled in the art that the invention is not restricted to the examples presented above, but the different embodiments of the invention may vary within the scope of the ensuing claims. Instead of the calibrating basin having a subatmospheric pressure, for example, one may equally well use pressure calibrating equipment wherein the structural difference is a plug within the pipe blank. This makes it possible to maintain a superatmospheric pressure within the blank pipe. The moulds may also be employed as a structural part for the calibrating basin, i.e. the calibrating basin constituted by a closed chain of moulds and end elements disposed at the forward and tail ends thereof.

We claim:

1. A production-line method for manufacturing corrugated and smooth-walled pipes, comprising:
    extruding molten pipe blanks;
    moulding one of the molten pipe blanks into a corrugated pipe in form halves that are movable along paths that press the form halves together about the one molten pipe blank;

2. A production-line method for manufacturing smooth-walled pipes, comprising:
    separating form halves from paths in a corrugator;
    inserting a calibrating basin between the paths;
    extruding a molten pipe blank;
    forming the molten pipe blank into a smooth-walled pipe in the calibrating basin when the paths are separated.

3. The production-line method of claim 1, and further comprising treating the corrugated pipe in the calibrating basin.

4. The production-line method of claim 2, and further comprising projecting the calibrating basin into the paths when the form halves are separated.

5. The production-line method of claim 1, and further comprising projecting the calibrating basin into the paths when the form halves are separated.

6. The production-line method of claim 2, and further comprising supporting the calibrating basin on the form halves when the paths thereof are separated when forming the smooth-walled pipe.

7. The production-line method of claim 1, and further comprising supporting the calibrating basin on the form halves when the paths thereof are separated when forming the smooth-walled pipe.

8. The production-line method of claim 4, and further comprising supporting the calibrating basin on the form halves when the paths thereof are separated when forming the smooth-walled pipe.

9. The production-line method of claim 5, and further comprising supporting the calibrating basin on the form halves when the paths thereof are separated when forming the smooth-walled pipe.

10. The production-line method of claim 6, wherein the supporting is by at least one distance piece.

11. The production-line method of claim 7, wherein the supporting is by at least one distance piece.

12. The production-line method of claim 8, wherein the supporting is by at least one distance piece.

13. The production-line method of claim 9, wherein the supporting is by at least one distance piece.

14. A production-line method for manufacturing smooth-walled pipe, comprising:
    separating in a corrugator form paths intended for manufacture of corrugated plastic pipe;
    inserting a calibrating basin intended for manufacture of smooth-walled plastic pipe between the separated form paths;
    extruding a molten pipe blank;
    forming a smooth-walled pipe in said calibrating basin by feeding said molten pipe blank into said calibrating basin while it is fixed between said separated form paths.

* * * * *

UNITED STATES PATENT AND TRADEMARK OFFICE
CERTIFICATE OF CORRECTION

PATENT NO. : 5,171,500
DATED : DECEMBER 15, 1992
INVENTOR(S) : Dieter SCHARWACHTER, et al.

It is certified that error appears in the above-indentified patent and that said Letters Patent is hereby corrected as shown below:

In column 3, Claim 1, line 7, after "blank;" insert a new paragraph -- separating the form halves from pressing together on the paths; and -- and another new paragraph -- forming another of the molten pipe blanks into a smooth-walled pipe in a calibrating basin when the paths are separated.--

Signed and Sealed this

Twenty-third Day of August, 1994

Attest:

BRUCE LEHMAN

Attesting Officer

Commissioner of Patents and Trademarks